US010249951B2

(12) United States Patent
Runyon et al.

(10) Patent No.: US 10,249,951 B2
(45) Date of Patent: Apr. 2, 2019

(54) MULTI-BEAM BI-FOCAL SHAPED REFLECTOR ANTENNA FOR CONCURRENT COMMUNICATION WITH MULTIPLE NON-COLLOCATED GEOSTATIONARY SATELLITES AND ASSOCIATED METHOD

(71) Applicant: VIASAT, INC., Carlsbad, CA (US)

(72) Inventors: Donald L Runyon, Duluth, GA (US); Sharad V Parekh, Frisco, TX (US)

(73) Assignee: VIASAT, INC., Carlsbad, CA (US)

( * ) Notice: Subject to any disclaimer, the term of this patent is extended or adjusted under 35 U.S.C. 154(b) by 0 days.

(21) Appl. No.: 15/516,197

(22) PCT Filed: Oct. 1, 2015

(86) PCT No.: PCT/US2015/053414
§ 371 (c)(1),
(2) Date: Mar. 31, 2017

(87) PCT Pub. No.: WO2016/054324
PCT Pub. Date: Apr. 7, 2016

(65) Prior Publication Data
US 2017/0250455 A1    Aug. 31, 2017

Related U.S. Application Data

(60) Provisional application No. 62/059,086, filed on Oct. 2, 2014.

(51) Int. Cl.
*H01Q 1/08* (2006.01)
*H01Q 1/12* (2006.01)
(Continued)

(52) U.S. Cl.
CPC ............. *H01Q 5/45* (2015.01); *H01Q 1/084* (2013.01); *H01Q 1/125* (2013.01);
(Continued)

(58) Field of Classification Search
USPC ........................................... 343/914
See application file for complete search history.

(56) References Cited

U.S. PATENT DOCUMENTS 4,786,910 A * 11/1988 Dragone .............. H01Q 25/007
343/753
5,136,294 A * 8/1992 Iwata ................... H01Q 25/007
343/914

(Continued)

FOREIGN PATENT DOCUMENTS

WO    WO-2002/071545 A1    9/2002
WO    WO-2016/054324 A1    4/2016

OTHER PUBLICATIONS

International Search Report and Written Opinion mailed in International (PCT) Application No. PCT/US2015/053414 dated Dec. 18, 2015, 15 pgs.

(Continued)

Primary Examiner — Howard Williams

(57) ABSTRACT

In one embodiment, a multi-beam antenna is described. The multi-beam antenna includes a reflector having a single reflector surface defining a first focal region and a second focal region. A first feed group is located within the first focal region. The first feed group includes a first feed oriented relative to the reflector define a first beam pointed in a first direction. The multi-beam antenna further includes a fixed attachment mechanism attaching the first feed group to the reflector such that a position of the first feed group is fixed relative to the reflector. The multi-beam antenna further includes a second feed group located within the second focal region. The second feed group includes a second feed oriented relative to the reflector to define a second beam pointed in a second direction. The multi-beam antenna further includes an adjustable attachment mechanism attaching the second feed group to the reflector in an adjustable relation to the reflector, whereby a difference between the first direction and the second direction is adjustable.

20 Claims, 9 Drawing Sheets

(51) Int. Cl.
*H01Q 1/28* (2006.01)
*H01Q 3/08* (2006.01)
*H01Q 3/18* (2006.01)
*H01Q 5/45* (2015.01)
*H01Q 15/14* (2006.01)
*H01Q 19/13* (2006.01)
*H01Q 25/00* (2006.01)
*H04B 7/185* (2006.01)
*H04H 40/90* (2008.01)

(52) U.S. Cl.
CPC ......... *H01Q 1/1228* (2013.01); *H01Q 1/1257* (2013.01); *H01Q 1/1264* (2013.01); *H01Q 1/288* (2013.01); *H01Q 3/08* (2013.01); *H01Q 3/18* (2013.01); *H01Q 15/14* (2013.01); *H01Q 19/132* (2013.01); *H01Q 25/007* (2013.01); *H04B 7/185* (2013.01); *H04H 40/90* (2013.01)

(56) References Cited

U.S. PATENT DOCUMENTS

| | | |
|---|---|---|
| 5,283,591 A | 2/1994 | Delmas |
| 6,121,939 A | 9/2000 | Imaizumi et al. |
| 6,181,289 B1 | 1/2001 | Matsui |
| 6,222,495 B1 * | 4/2001 | Cook .................. H01Q 3/2658 343/832 |
| 6,512,485 B2 | 1/2003 | Luly et al. |
| 6,535,176 B2 | 3/2003 | Spirtus |
| 6,535,177 B1 | 3/2003 | Dhellemmes et al. |
| 6,580,401 B1 * | 6/2003 | Gerhard ............... H01Q 21/061 343/853 |
| 7,855,680 B2 | 12/2010 | Norin et al. |
| 8,334,815 B2 | 12/2012 | Monte et al. |
| 2006/0181472 A1 | 8/2006 | Baird et al. |
| 2010/0013727 A1 * | 1/2010 | Pifer ...................... H01Q 1/125 343/779 |

OTHER PUBLICATIONS

International Preliminary Report on Patentability mailed in International (PCT) Application No. PCT/US2015/053414 dated Apr. 4, 2017, 12 pgs.

Craig et al., "A High Aperture Efficiency, Wide-Angle Scanning Offset Reflector Antenna", IEEE Transactions on Antennas and Propagation, vol. 41, No. 11, Nov. 1993, pp. 1481-1490.

Rappaport et al., "A 60 degree scanning offset reflector antenna with high aperture efficiency", Antennas and Propagation Society International Symposium, AP-S. Merging Technologies for the 90's Digest, IEEE, 1990, pp. 148-151.

Viskum, "Shaped single-offset DBS-reception antenna for multiple satellites", Antennas and Propagation Society International Symposium, IEEE, vol. 2, 2003, pp. 357-360.

* cited by examiner

MULTI-BEAM BI-FOCAL SHAPED REFLECTOR ANTENNA FOR CONCURRENT COMMUNICATION WITH MULTIPLE NON-COLLOCATED GEOSTATIONARY SATELLITES AND ASSOCIATED METHOD

CROSS-REFERENCE TO RELATED APPLICATION

This application claims priority to U.S. Provisional Application No. 62/059,086 titled "Multi-Beam Shaped Reflector Antenna for Concurrent Communication with Multiple Satellites" filed 2 Oct. 2014, which is incorporated by reference herein.

BACKGROUND

The present disclosure generally relates to satellite communications, and more specifically to a multi-beam antenna that can provide concurrent communication with multiple geostationary satellites.

A geostationary satellite is a satellite that is in geostationary Earth orbit (GEO) about 35,800 km above Earth's equator, and has a revolution around the Earth synchronized with Earth's rotation. As a result, the geostationary satellite appears stationary to an observer on the Earth's surface.

Geostationary satellites occupy orbital slots separated in longitude along the geostationary arc above the Earth's equator. These geostationary satellites, which operate using various frequencies and polarizations, provide a variety of broadcast and communication services.

A ground-based antenna for communication with a geostationary satellite typically has high antenna gain and a very narrow beam pointed at the geostationary satellite, because of the large distance to the satellite and to avoid interference with other satellites. To communicate with multiple geostationary satellites, a given location may include multiple antennas that individually communicate with one of the satellites. However, having multiple antennas at a given location can be difficult and costly.

SUMMARY

In one embodiment, a multi-beam antenna is described. The multi-beam antenna includes a reflector having a single reflector surface defining a first focal region and a second focal region. A first feed group is located within the first focal region. The first feed group includes a first feed oriented relative to the reflector define a first beam pointed in a first direction. The multi-beam antenna further includes a fixed attachment mechanism attaching the first feed group to the reflector such that a position of the first feed group is fixed relative to the reflector. The multi-beam antenna further includes a second feed group located within the second focal region. The second feed group includes a second feed oriented relative to the reflector to define a second beam pointed in a second direction. The multi-beam antenna further includes an adjustable attachment mechanism attaching the second feed group to the reflector in an adjustable relation to the reflector, whereby a difference between the first direction and the second direction is adjustable.

In another embodiment, a method of antenna pointing is described. The method includes providing a multi-beam antenna including a reflector. The reflector has a single reflector surface defining a first focal region and a second focal region. The method further includes arranging a first feed group of the multi-beam antenna within the first focal region and in fixed relation to the reflector. The first feed group includes a first feed illuminating the reflector to produce a first beam. The method further includes positioning the multi-beam antenna to point the first beam at a first geostationary satellite. The method further includes arranging a second feed group within the second focal region and in adjustable relation to the reflector. The feed group includes a second feed illuminating the reflector to produce a second beam pointed at a second geostationary satellite.

In yet another embodiment, a multi-beam antenna is described. The multi-beam antenna includes a means for simultaneously reflecting electromagnetic energy between a first direction and a first focal region, and between a second direction and a second focal region. The multi-beam antenna further includes a first feed group located within the first focal region. The first feed group includes a first feed oriented to define a first beam having the first direction. The multi-beam antenna further includes a means for arranging the first feed group such that the first feed group is in a fixed position relative to the means for simultaneously reflecting electromagnetic energy. The multi-beam antenna further includes a second feed group within the second focal region. The second feed group includes a second feed oriented to define a second beam having the second direction. The multi-beam antenna further includes a means for arranging the second feed group relative to the means for simultaneously reflecting electromagnetic energy such that the second direction is adjustable relative to the first direction.

DETAILED DESCRIPTION

Figure 1:
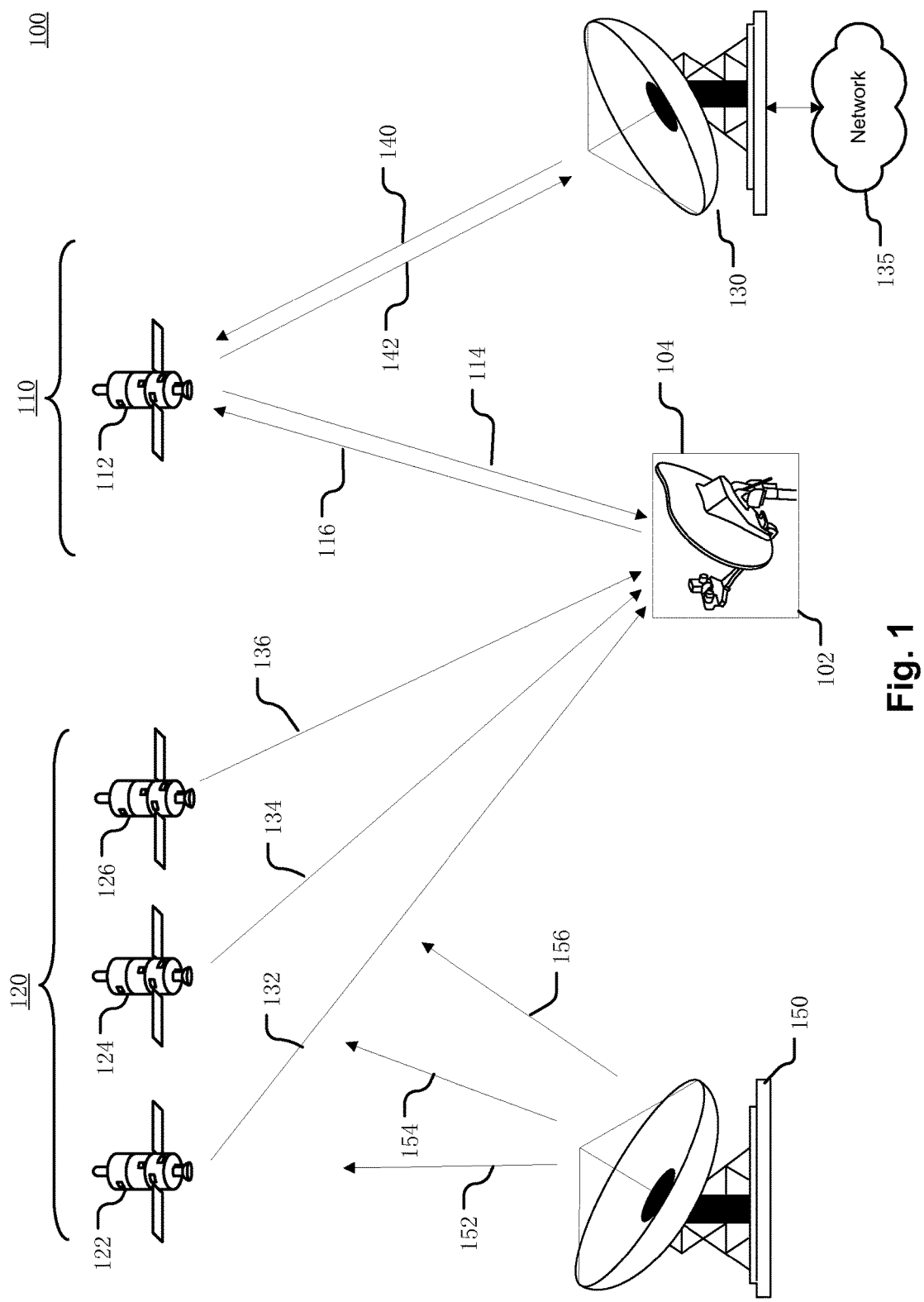
FIG. 1 illustrates an example satellite communication system in which a multi-beam antenna as described herein can be used.

A multi-beam antenna as described herein can provide efficient, concurrent communication with two groups of geostationary satellites which may be non-collocated. The multi-beam antenna includes multiple feeds that can provide multiple high efficiency directive beams, which may be in different frequency bands, to provide one-way (unidirectional) and/or two-way (bidirectional) communication with each of the geostationary satellites. In one embodiment, the multi-beam antenna provides bidirectional communication with a first geostationary satellite to deliver two-way data communications such as Internet and/or telephone service, and also receives direct broadcast satellite (DBS) programming signals from a second geostationary satellite to deliver television service. The second geostationary satellite may be non-collocated with the first geostationary satellite. In doing so, Internet, telephone and television services provided from non-collocated geostationary satellites can be delivered to a user by installation of a single multi-beam antenna at the user location.

The multi-beam antenna includes a reflector having a single reflector surface that defines at least two focal regions. Each of the two or more focal regions can be spaced apart from one another and may not be co-located with a centerline of the reflector. In embodiments in which the single reflector surface defines two focal regions, the reflector can be referred to as a bifocal or bicollimated reflector.

A first feed group, comprising one or more feeds arranged within the first focal region, facilitates communication between the multi-beam antenna and a first satellite group of one or more geostationary satellites. The first feed group illuminates the reflector to produce a corresponding first beam group of one or more beams pointed at the first satellite group.

As used herein, a beam of the multi-beam antenna that is "pointed" at a corresponding geostationary satellite has a main antenna beam with sufficient antenna gain in the direction of the corresponding geostationary satellite to permit communication of signals and provide sufficient interference rejection with other satellites. The interference rejection may be provided at least in part by the corresponding satellite having a frequency and/or polarization of operation different than that of one or more nearby satellites. The communication may be bidirectional (i.e., the multi-beam antenna transmits signals to the geostationary satellite and also receives signals from the geostationary satellite) or unidirectional (i.e., the multi-beam antenna either transmits signals to the geostationary satellite or receives signals from the geostationary satellite, but not both). The direction of the corresponding geostationary satellite may be the boresight direction of maximum gain of the beam. Alternatively, the gain of the beam in the direction of the corresponding geostationary satellite may be less than the maximum gain of the beam. In other words, the direction of the corresponding satellite may not be in the exact center of the beam. This may for example be due to manual pointing accuracy limitations. For example, the direction of the corresponding geostationary satellite may be within the 1 dB beamwidth of the beam.

A second feed group, comprising one or more feeds arranged within the second focal region, facilitates communication between the multi-beam antenna and a second satellite group of one or more geostationary satellites. The second feed group illuminates the reflector to produce a corresponding second beam group of one or more beams pointed at the second satellite group.

In some embodiments, the first satellite group and the second satellite group may be non-collocated along the geostationary arc. As used herein, the first satellite group and the second satellite group are "non-collocated" if the angular separation along the geostationary arc between the two nearest satellites is at least 10 degrees. For example, the angular separation between the two nearest satellites may be at least 15 degrees. As another example, the angular separation may be between 15-30 degrees.

As described in more detail below, the first feed group is fixedly arranged within the first focal region by a fixed attachment mechanism, such that the position of the first feed group is fixed relative to the reflector. In contrast, the second feed group is adjustably arranged within the second focal region via an adjustable attachment mechanism. The adjustable attachment mechanism provides for adjustment of the position of the second feed group relative to the reflector. In doing so, the angular separation between the second beam group and the first beam group can be changed. This adjustment may include one or both of the location and orientation of the second feed group.

The adjustable attachment mechanism can accommodate the differences in the effective angular separation of the second satellite group relative to the first satellite group, when the multi-beam antenna is placed across a range of geographic locations. This pairing of the fixed and adjustable feed groups can facilitate efficient installation of the multi-beam antenna and can provide degrees of freedom sufficient for pointing these distinct beam groups to each of the satellites of the first satellite group and the second satellite group.

FIG. 1 illustrates an example satellite communication system 100 in which a multi-beam antenna 104 (not to scale) as described herein can be used. Many other configurations are possible having more or fewer components than the satellite communication system 100 of FIG. 1.

The multi-beam antenna 104 may for example be attached to a structure such as the roof or side wall of a house. As described in more detail below, the multi-beam antenna 104 provides multiple high efficiency directive beams to facilitate concurrent communication with a first satellite group 110 of one or more geostationary satellites and a second satellite group 120 of one or more geostationary satellites. As used herein, a "group" of elements may include one or more elements.

In the illustrated embodiment, the multi-beam antenna 104 is part of a fixed user terminal 102. The fixed user terminal 102 may also include memory for storage of data and software applications, a processor for accessing data and executing applications, and components that facilitate communication over the satellite communication system 100. Although only one fixed user terminal 102 is illustrated in FIG. 1 to avoid over complication of the drawing, the satellite communication system 100 may include many fixed user terminals 102.

In the illustrated embodiment, the first satellite group 110 includes a single geostationary satellite 112 that is referred to hereinafter as "first" satellite. More generally, the first satellite group 110 may include one or more geostationary satellites. In embodiments in which the first satellite group 110 includes multiple geostationary satellites, each of the satellites of the first satellite group 110 may for example be collocated along the geostationary arc. As used herein, the satellites of a satellite group are "collocated" if the angular separation along the geostationary arc between the two farthest satellites of the satellite group is less than 10 degrees.

In the illustrated embodiment, first satellite 112 provides bidirectional communication between the fixed user terminal 102 and a gateway terminal 130. The gateway terminal 130 is sometimes referred to as a hub or ground station. The gateway terminal 130 includes an antenna to transmit a forward uplink signal 140 to the first satellite 112 and to receive a return downlink signal 142 from the first satellite 112. The gateway terminal 130 may also schedule traffic to the fixed user terminal 102. Alternatively, the scheduling may be performed in other parts of the satellite communication system 100 (e.g., a core node, satellite access node, or other components, not shown). Signals 140,142 communicated between gateway terminal 130 and first satellite 112 may use the same, overlapping, or different frequencies as signals 114, 116 communicated between first satellite 112 and fixed user terminal 102. Gateway terminal 130 may be located remotely from fixed user terminal 102 to enable frequency reuse. By separating the gateway terminal 130 and the fixed user terminal 102, spot beams with common frequency bands can be geographically separated to avoid interference.

Network 135 is interfaced with the gateway terminal 130. The network 135 may be any type of network and can include for example, the Internet, an IP network, an intranet, a wide area network (WAN), a local area network (LAN), a virtual private network (VPN), a virtual LAN (VLAN), a fiber optic network, a cable network, a public switched telephone network (PSTN), a public switched data network (PSDN), a public land mobile network, and/or any other type of network supporting communication between devices as described herein. The network 135 may include both wired and wireless connections as well as optical links. The network 135 may connect multiple gateway terminals 130 that may be in communication with first satellite 112 and/or with other satellites.

The gateway terminal 130 may be provided as an interface between the network 135 and the first satellite 112. The gateway terminal 130 may be configured to receive data and information directed to the fixed user terminal 102. The gateway terminal 130 may format the data and information and transmit forward uplink signal 140 to the first satellite 112 for delivery to the fixed user terminal 102. Similarly, the gateway terminal 130 may be configured to receive return downlink signal 142 from the first satellite 112 (e.g. containing data and information originating from the fixed user terminal 102) that is directed to a destination accessible via the network 135. The gateway terminal 130 may also format the received return downlink signal 142 for transmission on the network 135.

The first satellite 112 receives the forward uplink signal 140 from the gateway terminal 130 and transmits corresponding forward downlink signal 114 to the fixed user terminal 102. Similarly, the first satellite 112 receives return uplink signal 116 from the fixed user terminal 102 and transmits corresponding return downlink signal 142 to the gateway terminal 130. The first satellite 112 may operate in a multiple spot beam mode, transmitting and receiving a number of narrow beams directed to different regions on Earth. This allows for segregation of fixed user terminals 102 into various narrow beams. Alternatively, the first satellite 112 may operate in wide area coverage beam mode, transmitting one or more wide area coverage beams.

The first satellite 112 may be configured as a "bent pipe" satellite that performs frequency and polarization conversion of the received signals before retransmission of the signals to their destination. As another example, the first satellite 112 may be configured as a regenerative satellite that demodulates and remodulates the received signals before retransmission.

The multi-beam antenna 104 of the fixed user terminal 102 includes a first feed group of one more feeds to facilitate communication with the first satellite group 110. In the illustrated embodiments described below, each feed of the first feed group produces an individual beam pointed at a corresponding satellite of the first satellite group 110 to facilitate communication between the fixed user terminal 102 and the corresponding satellite. That is, there is a one-to-one correspondence between a feed of the first feed group and a satellite of the first satellite group 110 in the illustrated embodiments described below. Alternatively, a variety of other arrangements among the feeds of the first feed group and the satellites of the first satellite group 110 may be implemented. For example, a feed of the first feed group may include multiple feed elements that are combined to provide for fixed or electronic beam steering.

In the illustrated embodiment in which the first satellite group 110 includes only the first satellite 112, the first feed group of the multi-beam antenna 104 includes a single feed (hereinafter referred to as the "first" feed) operable over the frequency ranges of the forward downlink signal 114 and the return uplink signal 116. As described in more detail below, the first feed illuminates a single reflector surface of a reflector of the multi-beam antenna 104 to produce a first beam pointed at the first satellite 112 to provide for transmission of the return uplink signal 116 and reception of the forward downlink signal 114.

As shown in FIG. 1, the satellite communication system 100 also includes a second satellite group 120. The first satellite group 110 and the second satellite group 120 can be non-collocated. For example, the angular separation along the geostationary arc between the two nearest satellites of the first and second satellite groups 110, 120 may be at least 15 degrees. As another example, the angular separation may be between 15-30 degrees. Alternatively, other angular separations between the first and second satellite groups 110, 120 may be implemented.

In the illustrated embodiment, the second satellite group 120 includes second satellite 122, third satellite 124, and fourth satellite 126. Alternatively, the number of satellites in the second satellite group 120 may be different than three. Most generally, the second satellite group 120 may include one or more satellites. A given satellite of the second satellite group 120 may, for example, be configured as a bent pipe or regenerative satellite. The satellites 122, 124, 126 of the second satellite group 120 may for example be collocated.

In the illustrated embodiment, the second satellite 122, third satellite 124, and fourth satellite 126 transmit respective direct broadcast satellite (DBS) programming signals 132, 134, 136 to provide receive-only television service to the fixed user terminal 102. The second satellite 122, third satellite 124 and fourth satellite 126 receive respective DBS uplink signals 152, 154, 156 from one or more DBS ground stations 150, and transmit corresponding respective DBS programming signals 132, 134, 136 to the fixed user terminal 102.

The multi-beam antenna 104 of the fixed user terminal 102 includes a second feed group, comprising one more feeds, to facilitate communication with the second satellite group 120. In the illustrated embodiment in which second satellite group 120 includes three satellites, the second feed group includes three feeds (individually referred to hereinafter as the "second" feed, the "third" feed and the "fourth" feed) to separately receive one of the DBS programming signals 132, 134, 136. Alternatively, a variety of other arrangements among the feeds of the second feed group and the satellites of the second satellite group 120 may be implemented.

The second feed illuminates the single reflector surface of a reflector of the multi-beam antenna 104 to produce a second beam pointed at the second satellite 122 to provide for reception of the DBS programming signal 132. Similarly, the third feed illuminates the single reflector surface to produce a third beam pointed at the third satellite 124 to provide for reception of the DBS programming signal 134. In addition, the fourth feed illuminates the single reflector surface to produce a fourth beam pointed at the fourth satellite 126 to support reception of the DBS programming signal 136.

In the illustrated embodiment, the fixed user terminal 102 includes a transceiver (not shown) to transmit to and receive signals from the first satellite 112, and one or more receivers (not shown) to receive the DBS programming signals 132, 134, 136 from each of the second satellite 122, third satellite 124, and fourth satellite 126. More generally, the fixed user terminal 102 may include various components to facilitate communication bidirectionally (transmit and receive) or facilitate communication unidirectionally (either transmit or receive, but not both) with each satellite of the first and second satellite groups 110, 120.

The geostationary orbital slot of each of the satellites of the first and second satellite groups 110, 120 can vary from embodiment to embodiment. In one embodiment, the first satellite 112 is ViaSat-1, owned by ViaSat, Inc., which is located at approximately 115 degrees West longitude (WL), and the second satellite 122, third satellite 124, and fourth satellite 126 are DBS satellites located at approximately 99 degrees WL, 101 degrees WL, and 103 degrees WL respectively. In another embodiment, the first satellite group 110 includes DBS satellites at approximately 110 degrees WL and 119 degrees WL and ViaSat-1 at approximately 115 degrees WL, and the second satellite group 120 includes the DBS satellites located at 99 degrees WL, 101 degrees WL, and 103 degrees WL. In yet another embodiment, the first satellite group 110 includes DBS satellites at approximately 110 degrees WL and 119 degrees WL and ViaSat-1 at 115 degrees WL, and the second satellite group 120 includes a satellite located at 129 degrees WL. In yet another embodiment, the first satellite 112 is located at approximately 70 WL and the second satellite 122 is located at approximately 95 WL.

The frequency and polarization of operation of each of the satellites of the first and second satellite groups 110, 120 can vary from embodiment to embodiment. In one embodiment, the frequency range of the forward downlink signal 114 is from 17.7 to 20.2 GHz and the frequency range of the return uplink signal 116 is from 27.5 to 30.0 GHz, the frequency range of the DBS programming signal 132 and the DBS programming signal 136 are each from 18.3 GHz to 18.8 GHz and 19.7 to 20.2 GHz, and the frequency range of the DBS programming signal 134 is from 12.2 to 12.7 GHz. DBS services worldwide can have regional dependent frequency band allocations, so some regions may include 11.7 to 12.2 GHz or 10.7 to 12.75 GHz.

Figure 2:
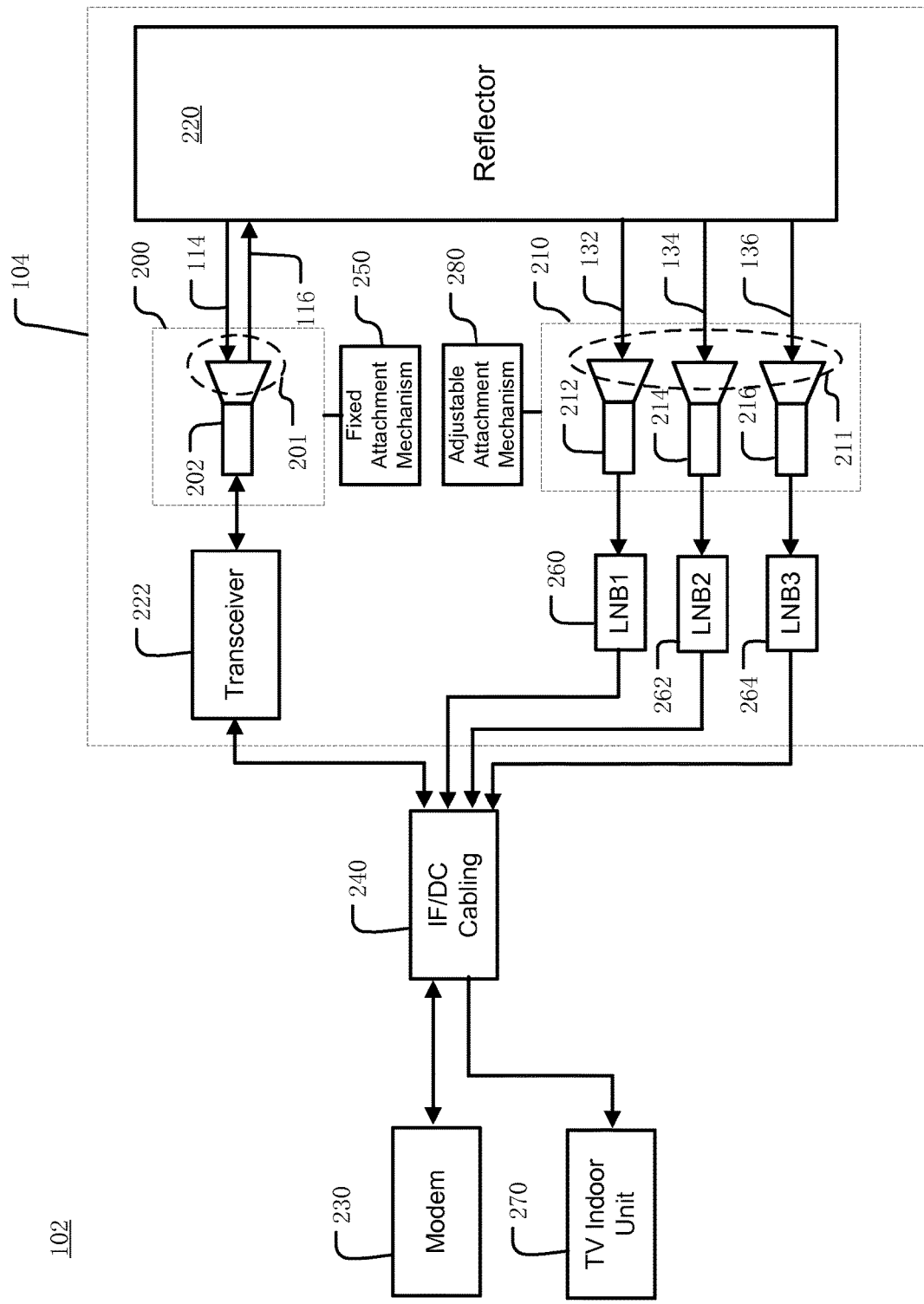
FIG. 2 is a block diagram illustrating an example of the fixed user terminal of FIG. 1.

FIG. 2 is a block diagram illustrating an example of the fixed user terminal 102 of FIG. 1. Many other configurations are possible having more or fewer components than the fixed user terminal 102 shown in FIG. 2. Moreover, the functionalities described herein can be distributed among the components in a different manner than described herein.

The multi-beam antenna 104 includes a first feed group 200 and a second feed group 210 that each illuminates a reflector surface of reflector 220. The reflector surface comprises one or more electrically conductive materials that reflect electromagnetic energy. In the illustrated embodiment, the first feed group 200 and the second feed group 210 directly illuminate the single reflector surface of the reflector.

As described in more detail below, the shape of the single reflector surface of the reflector 220 is designed to define a first focal region 201 and a second focal region 211 spaced apart from one another. As used herein, the term "spaced apart" refers to the first focal region 201 and the second focal region 211 having a space between them such that the first focal region 201 and the second focal region 211 do not touch or overlap one another. The first feed group 200 is positioned within the first focal region 201 to illuminate the reflector 220 to produce a first beam group pointed at the first satellite group 110. The first focal region 201 is a three-dimensional volume within which the reflector 220 causes electromagnetic energy to converge sufficient to permit signal communication having desired performance characteristics if an incident plane wave arrives from the direction of a corresponding satellite of the first satellite group 110. In embodiments in which the first satellite group 110 includes multiple satellites, the first focal region 201 is the region that includes each of those volumes. Reciprocally, the reflector 220 reflects electromagnetic energy originating from a feed at a location within the first focal region 201 such that the reflected electromagnetic energy adds constructively in the direction of the corresponding satellite of the first satellite group 110 sufficient to permit signal communication having desired performance characteristics, while partially or completely cancelling out in all other directions.

In the illustrated embodiment, the first feed group 200 includes only the first feed 202. More generally, the first feed group 200 may include one or more feeds.

As shown in FIG. 2, the first feed 202 illuminates the reflector 220 to produce a first beam pointed at the first satellite 112 to provide for transmission of the return uplink signal 116 and reception of the forward downlink signal 114. That is, the forward downlink signal 114 from the first satellite 112 is focused by the reflector 220 and received by the first feed 202 positioned at a location within the first focal region 201. Similarly, the return uplink signal 116 from the first feed 202 is reflected by the reflector 220 to focus the return uplink signal 116 in the direction of the first satellite 112.

The first feed 202 may for example be a waveguide-type feed structure including a horn antenna and may include dielectric inserts. Alternatively, other types of structures and feed elements may be used.

The first feed 202 communicates the return uplink signal 116 and the forward downlink signal 114 with transceiver 222 to provide for bidirectional communication with the first satellite 112. In the illustrated embodiment, transceiver 222 is located on the multi-beam antenna 104. Alternatively, the transceiver 222 may be located in a different location that is not on the multi-beam antenna 104.

The transceiver 222 can amplify and then downconvert the return uplink signal 116 received from the first feed 202 to generate an intermediate frequency (IF) receive signal for delivery to modem 230. Similarly, the transceiver 222 can upconvert and then amplify an IF transmit signal received from the modem 230 to generate the return uplink signal 116 for delivery to the first feed 202. The modem 230 may for example be located inside the structure to which the multi-beam antenna 104 is attached. As another example, the modem 230 may be located on the multi-beam antenna 104, such as being incorporated within the transceiver 222.

In the illustrated embodiment, the transceiver 222 communicates the IF receive signal and IF transmit signal with the modem 230 via IF/DC cabling 240 that is also used to provide DC power to the transceiver 222. Alternatively, the transceiver 222 and the modem 230 may for example communicate the IF transmit signal and IF receive signal wirelessly.

The modem 230 respectively modulates and demodulates the IF receive and transmit signals to communicate data with a router (not shown). The router may for example route the data among one or more end user devices (not shown), such as laptop computers, tablets, mobile phones, etc., to provide bidirectional data communications, such as two-way Internet and/or telephone service.

The multi-beam antenna 104 includes a fixed attachment mechanism 250 to fixedly attach the first feed group 200 to the multi-beam antenna 104, such that the position of the first feed group 200 is fixed relative to the reflector 220. As used herein, two elements are "fixedly attached" when they are coupled to each other in fixed physical relationship (i.e., distance and orientation) relative to each other in a manner that is not readily adjusted (e.g., by an end user). For example, elements may be "fixedly attached" when they are attached to each other or to an intermediate structure by welding, bolting, screwing, and similar arrangements.

The fixed attachment mechanism 250 can vary from embodiment to embodiment. In one embodiment, the fixed attachment mechanism 250 includes a support boom that fixedly attaches the first feed group 200 to the reflector 220. The support boom may for example be attached to the first feed group 200 via one or more male-female fitting elements, such as by screwing a threaded male end into a threaded female fitting within the support boom. The support boom may be attached to the reflector 220 in a similar manner. Alternatively, other types of retention means may be used to fixedly attach the first feed group 200 to the multi-beam antenna 104, such as standard screw fasteners, clamps, quick disconnect, bayonet, expansion sleeve, and the like.

The second feed group 210 is positioned within the second focal region 211 to illuminate the reflector 220 to produce a second beam group that can be adjustably pointed at the second satellite group 120. The second focal region 211 is a three-dimensional volume within which the reflector 220 causes electromagnetic energy to converge sufficient to permit signal communication having desired performance characteristics if an electromagnetic wave arrives from the direction of a corresponding satellite in the second satellite group 120. In embodiments in which the second satellite group 120 includes multiple satellites, the second focal region 211 is a region that includes each of those volumes. Reciprocally, the reflector 220 reflects electromagnetic energy originating from a feed within the second focal region 211 such that the reflected electromagnetic energy add constructively in the direction of the corresponding satellite of the second satellite group 120 sufficient to permit signal communication having desired performance characteristics, while partially or completely cancelling out in all other directions.

In the illustrated embodiment, the second feed group 210 includes second feed 212, third feed 214 and fourth feed 216. The second feed 212 illuminates the reflector 220 to produce a second beam pointed at the second satellite 122 to provide for reception of the DBS programming signal 132. That is, the DBS programming signal 132 from the second satellite 122 is focused by the reflector 220 at the location of the second feed 212 within the second focal region 211. Similarly, the third feed 214 illuminates the reflector 220 to produce a third beam pointed at the third satellite 124 to provide for reception of the DBS programming signal 134. The fourth feed 216 directly illuminates the reflector 220 to produce a fourth beam pointed at the fourth satellite 126 to provide for reception of the DBS programming signal 136.

Each of the second feed 212, third feed 214 and fourth feed 216 may for example be a waveguide-type feed structure including a horn antenna and may include dielectric inserts. Alternatively, other types of structures and feed elements may be used.

In the illustrated embodiment, a first low noise block down converter (LNB) 260 (labeled "LNB1" in FIG. 2), located on the multi-beam antenna 104, amplifies and down-converts the received DBS programming signal 132 to a first intermediate frequency signal for delivery to TV indoor unit 270 via the IF/DC Cabling 240. Similarly, LNB2 262 amplifies and downconverts the received DBS programming signal 134 and LNB3 264 amplifies and downconverts the received DBS programming signal 136. The TV indoor unit 270 includes a receiver to receive the intermediate frequency signals and generate television and/or audio signals for delivery to one or more end user devices (not shown), such as a television, computer or audio system.

The multi-beam antenna 104 includes an adjustable attachment mechanism 280 to provide for adjustment of the position of the second feed group 210 relative to the reflector 220. As used herein, two elements "adjustably attached" are attached in a manner that is intended to provide for adjustment relative to one another.

The adjustable attachment mechanism 280 allows the direction(s) of the second beam group to be changed, without changing the direction(s) of the first beam group. In other words, the adjustable attachment mechanism 280 allows the difference between the direction of a beam of the second beam group and the direction a beam of the first beam group to be adjustable.

In some embodiments, the adjustable attachment mechanism 280 can change the direction of each beam of the second beam group, without significantly changing the relative differences in the directions of the beams of the second beam group. In doing so, the angular separation of the second beam group and the first beam group can be changed to accommodate differences in the effective angular separation between the second satellite group 120 and the first satellite group 110, when the multi-beam antenna 104 is placed across a range of geographic locations.

The adjustable attachment mechanism 280 can vary from embodiment to embodiment. The adjustable attachment mechanism 280 can provide at least one degree of freedom for adjusting the position of the second feed group 210 relative to the reflector 220. In one embodiment, the adjustable attachment mechanism 280 provides a single degree of freedom for adjusting the position of the second feed group 210. The single degree of freedom may for example be the location of the second feed group 210 along a line. In another embodiment, the adjustable attachment mechanism 280 provides two degrees of freedom for adjusting the position of the second feed group 210. The two degrees of freedom may for example provide for movement of the second feed group 210 within a plane.

In the illustrated embodiment, the second feed 212, third feed 214 and fourth feed 216 are fixedly attached to one another, such that the adjustable attachment mechanism 280 moves all the feeds 212, 214, 216 together at the same time. In one embodiment, second feed 212, third feed 214 and fourth feed 216 are formed within a single casting element.

The shape of the reflector 220 can vary from embodiment to embodiment. The shape of the reflector 220 can depend upon a number of factors such as one or more of the frequency band(s) of signals communicated with each satellite of the first satellite group 110 and the second satellite group 120, the orbital slot of each of the satellites of the first satellite group 110 and the second satellite group 120, the number of satellites within each of the first satellite group 110 and the second satellite group 120, the angular separation between the first satellite group 110 and the second satellite group 120, desired antenna pattern characteristics (e.g. beamwidth, gain, sidelobe levels, cross-polarization, circular polarization beam squint, etc.) of each of the beams of the first beam group and the second beam group, desired locations of the first focal region 201 and the second focal region 211, the antenna pattern characteristics of each feed of the first feed group 200 and the second feed group 210, etc.

The shape of the reflector 220 may for example be designed using computational reflector antenna software, such as POS software available from Tiera, Corp. Alternatively, other software may be used to design the shape of the reflector 220. The design of the shape of the reflector 220 may be an iterative process that includes selecting an initial shape, analyzing the performance of the multi-beam antenna 104 based on one or more factors such as those described above, and then adjusting the shape to experimentally optimize the shape.

Figure 3A:
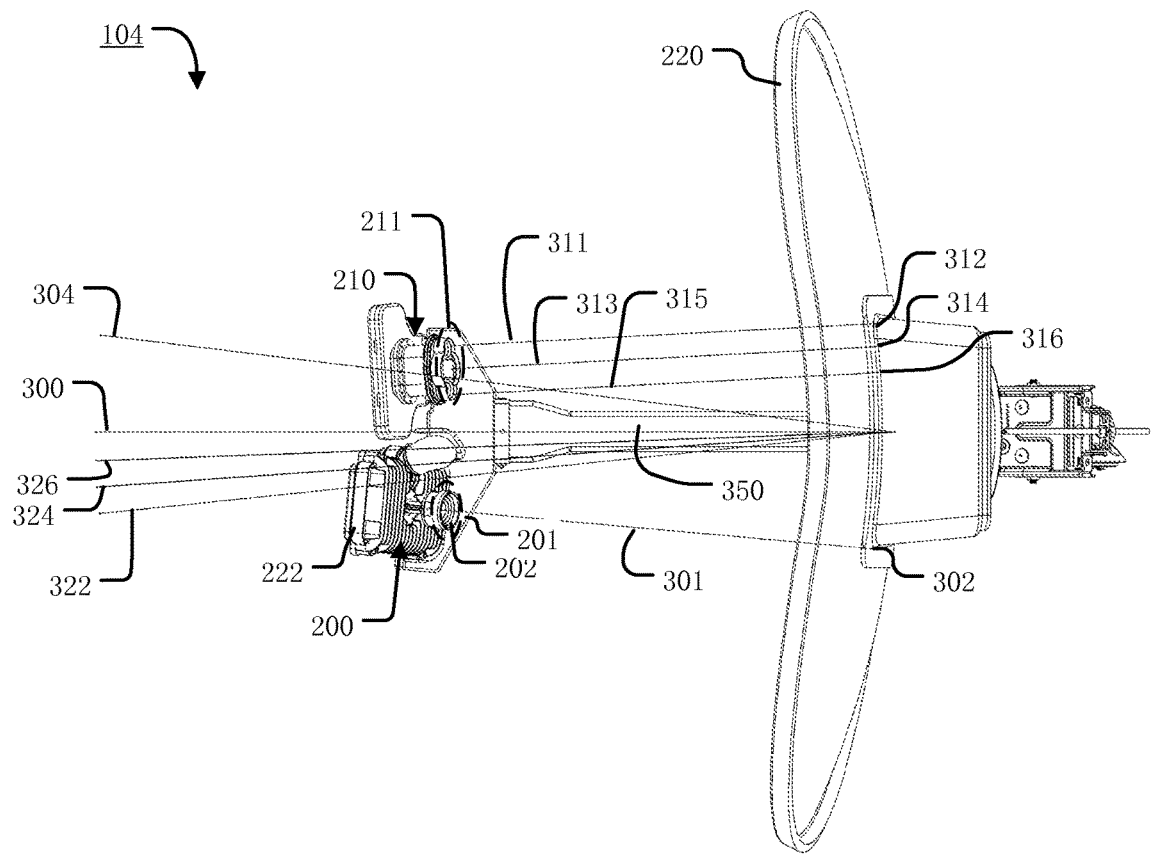
FIGS. 3A and 3B illustrate a top and perspective view of an example multi-beam antenna.
Figure 3B:
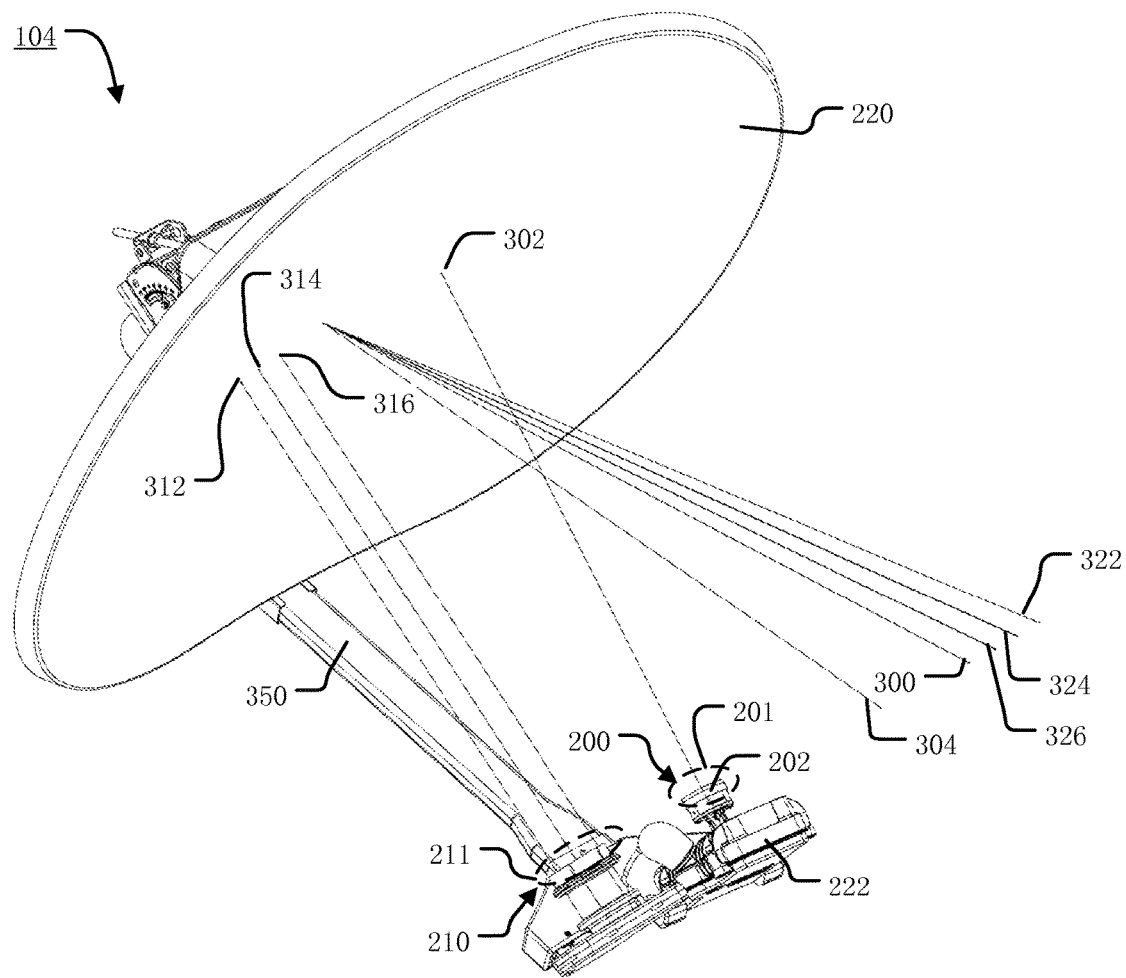

FIGS. 3A and 3B illustrate a top and perspective view of an example multi-beam antenna 104. In the illustrated embodiment, the multi-beam antenna 104 is an offset-fed single reflector antenna.

As can be seen in the illustrated embodiment of FIGS. 3A and 3B, the single reflector surface of the reflector 220 has a non-parabolic curvature and is designed to define the locations of the first focal region 201 and the second focal region 211. In the illustrated embodiment, the single reflector surface is a blend of two pseudo parabolic surfaces that collectively define the locations of the first focal region 201 and the second focal region 211 in an amplitude weighted fashion. That is, a central region of the single reflector surface is generally illuminated by both the first feed group 200 and the second feed group 210, while the right most region (generally centered around location 302) of the single reflector surface is primarily illuminated by the first feed group 200 and the left most region (generally centered around locations 312, 314, 316) of the single reflector surface is primarily illuminated by the second feed group 210. The absence of distinct focal points in the illustrated embodiment indicates there is no section of the reflector surface that is purely parabolic. The bounding edge geometry of the reflector 220 is a design choice and in the illustrated embodiment uses a perimeter defined by two semi-circular sections interconnected with a straight section that is positioned normal to the centerline 300.

The reflector 220 has a centerline 300 passing through the center of the reflector surface of the reflector 220. In the illustrated embodiment, the centerline 300 lies in a vertical plane that bisects the reflector surface resulting in left and right halves of the outer rim of the reflector 220 that are mirror images of one another. As can be seen in the top view of FIG. 3A, the first feed group 200 and the second feed group 210 are each offset from the centerline 300. The offset distances of each of the first feed group 200 and the second feed group 210 can vary from embodiment to embodiment.

In the illustrated embodiment, the first feed group 200 and the second feed group 210 are each offset from the centerline 300 in two perpendicular directions. That is, the centerline 300 does not intersect a projection of the first feed group 200 and the second feed group 210 onto a horizontal plane that is parallel to the page in the top view of FIG. 3A. In addition, the first feed group 200 and the second feed group 210 are on opposing sides of a vertical plane including the centerline 300 that extends into and out of the page in the top view of FIG. 3A. As a result, the centerline 300 is not aligned with any of the satellites of the first satellite group 110 and the second satellite group 120. Instead, the centerline 300 points to a location on or near the geostationary arc that lies between the first satellite 110 and the second satellite group 120.

The centerline 301 of the first feed 202 points to a first location 302 on the reflector 220. As a result of the position of the first feed 202 and the shape of the reflector 220, the first feed 202 illuminates the reflector 220 to produce the first beam pointed along line 304 in a first direction at the first satellite 112. In addition, as can be seen in FIG. 3A, the first feed 202 points towards the reflector 220 in a direction away from the centerline 300 of the reflector 220. In other words, the shortest distance from the first feed 202 to a vertical plane including the centerline 300 that extends into and out of the page in the top view of FIG. 3A is less than the shortest distance from the first location 302 to the vertical plane.

In the illustrated embodiment, the fixed attachment mechanism for the first feed group 200 includes a support boom 350 that fixedly attaches the first feed group 200 to the reflector 220. The support boom 350 may for example be attached to the first feed group 200 via one or more male-female fitting elements, such as by screwing a threaded male end into a threaded female fitting on the support boom 350. The support boom 350 may be attached to the reflector 220 in a similar manner. In the illustrated embodiment, the transceiver 222 and LNB1-LNB3 (not explicitly shown in FIGS. 3A and 3B) are also supported by the support boom 350.

As shown in FIGS. 3A and 3B, the centerline 311 of the second feed (ref. no. 212 of FIG. 2) of the second feed group 210 points to a second location 312, the centerline 313 of the third feed (ref. no. 214 of FIG. 2) of the second feed group 210 points to a third location 314, and the centerline 315 of the fourth feed (ref. no. 216 of FIG. 2) points to a fourth location 316.

As a result of the position of the second feed and the shape of the reflector 220, the second feed illuminates the reflector 220 to produce the second beam pointed along line 322 in a second direction at the second satellite 122. Similarly, the third feed illuminates the reflector 220 to produce the third beam pointed along the line 324 in a third direction at the third satellite 124. The fourth feed illuminates the reflector 220 to produce the fourth beam pointed along the line 326 in a fourth direction at the fourth satellite 126.

As can be seen in FIG. 3A, each of the second, third and fourth feeds points towards the reflector 220 in a direction away from the centerline 300 of the reflector 220. In other words, the shortest distance from the second feed (for example) to a vertical plane including the centerline 300 that extends into and out of the page in the top view of FIG. 3A is less than the shortest distance from the second location 312 to the vertical plane.

Figure 4A:
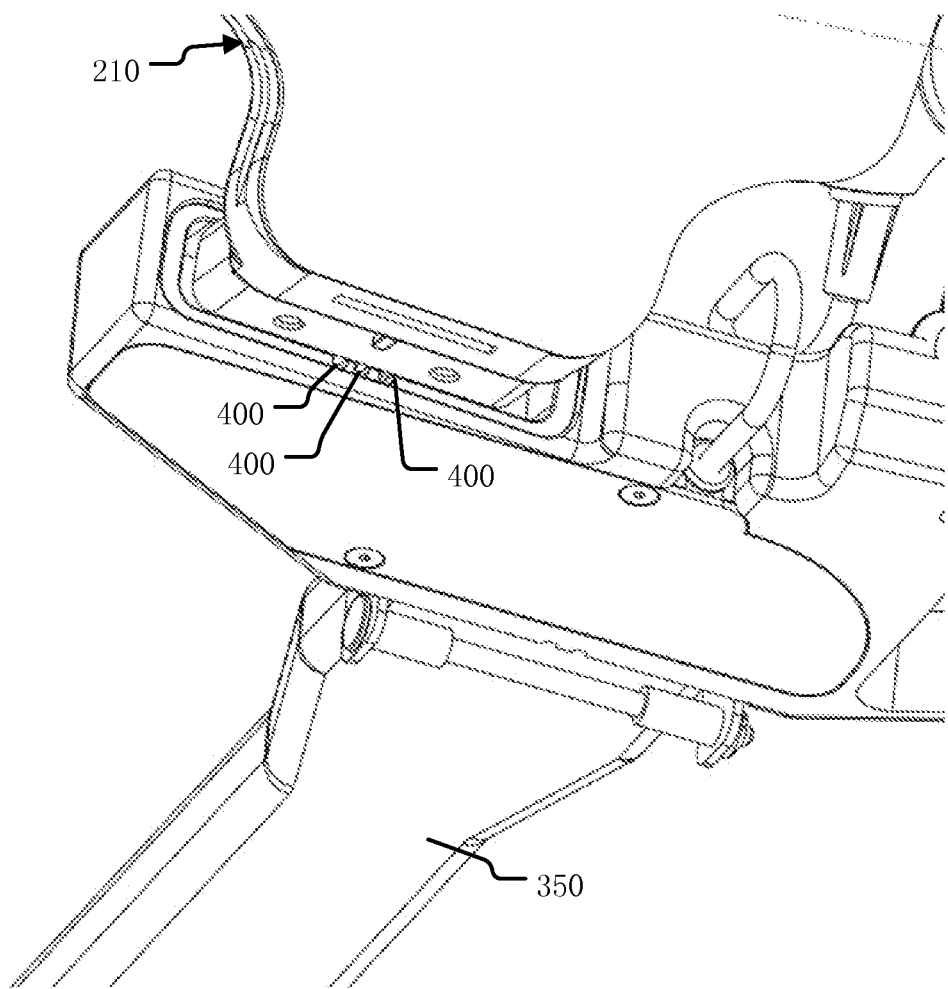
FIGS. 4A and 4B illustrate different expanded views of an example adjustable attachment mechanism that provides adjustment of the position of the second feed group relative to the reflector.
Figure 4B:
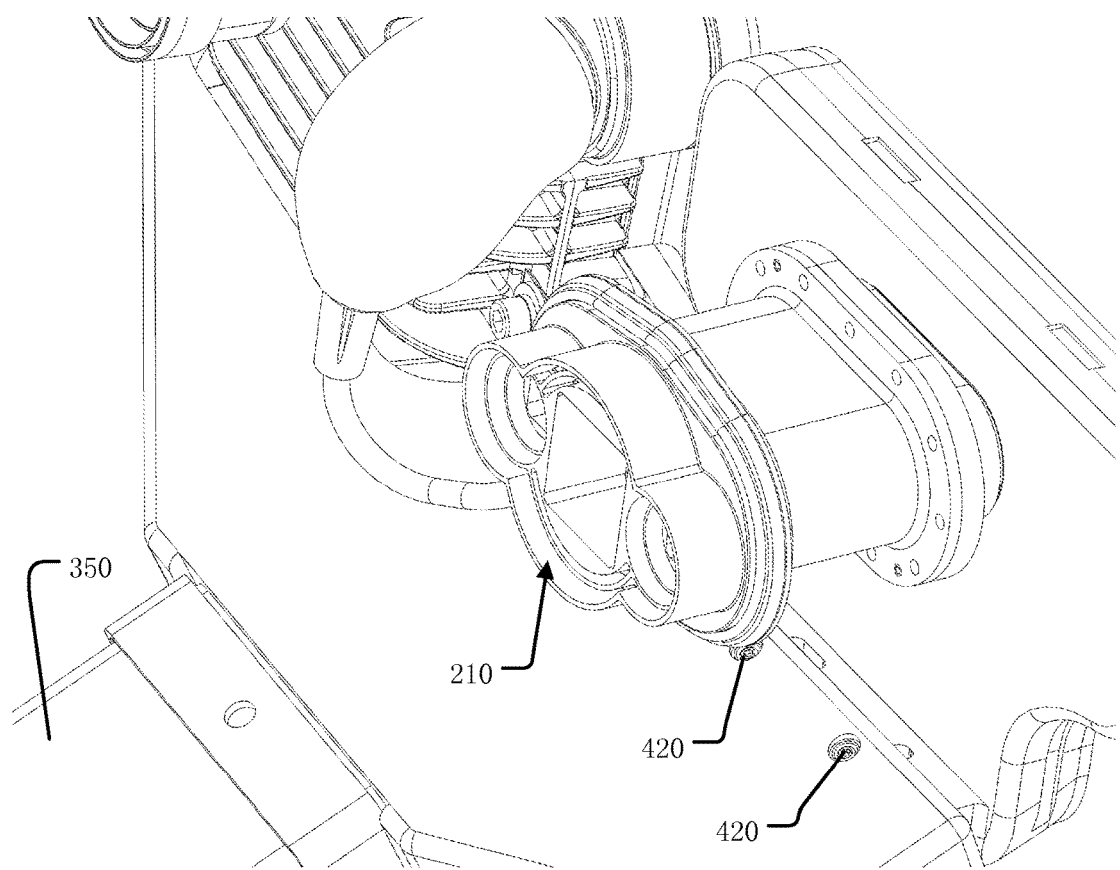

FIGS. 4A and 4B illustrate different expanded views of an example adjustable attachment mechanism that provides for adjustment of the position of the second feed group 210 relative to the reflector 220. In the illustrated embodiment, the second feed group 210 is adjustably attached to the support boom 350 via the adjustable attachment mechanism.

In the illustrated embodiment, the adjustable attachment mechanism includes three slots 400 (see, FIG. 4A) located in the support boom 350 and one tab (not shown) located in the second feed group 210. The position of the second feed group 210 can be changed by moving the second feed group 210 to change which of one of the slots 400 the tab is within. In other words, in the illustrated embodiment, the position of the second feed group 210 can be one of three predetermined positions along a line defined by the three slots 400. Upon selection of one of the predetermined positions for the second feed group 210, the second feed group 210 can then be locked into place by immobilizing the adjustable attachment mechanism. In the illustrated embodiment, the adjustable attachment mechanism is immobilized using for example one or more screws 420 or other male-female fitting elements. Alternatively, other mechanisms may be used for providing adjustment and subsequent immobilization of the position of the second feed group 210 relative to the reflector 220.

Figure 5A:
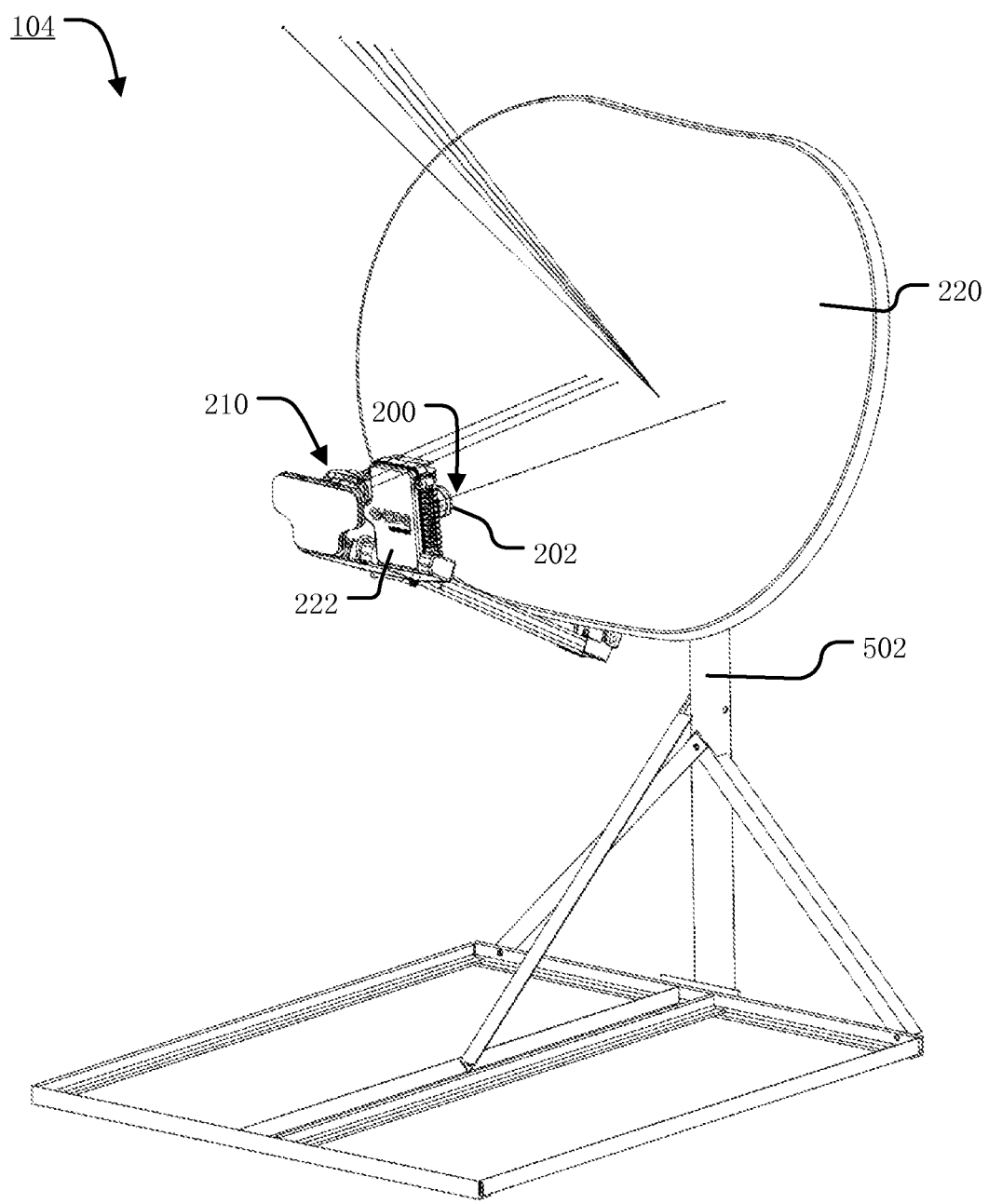
FIGS. 5A and 5B illustrate different perspective views of an example multi-beam antenna including a mounting bracket assembly and a mast.
Figure 5B:
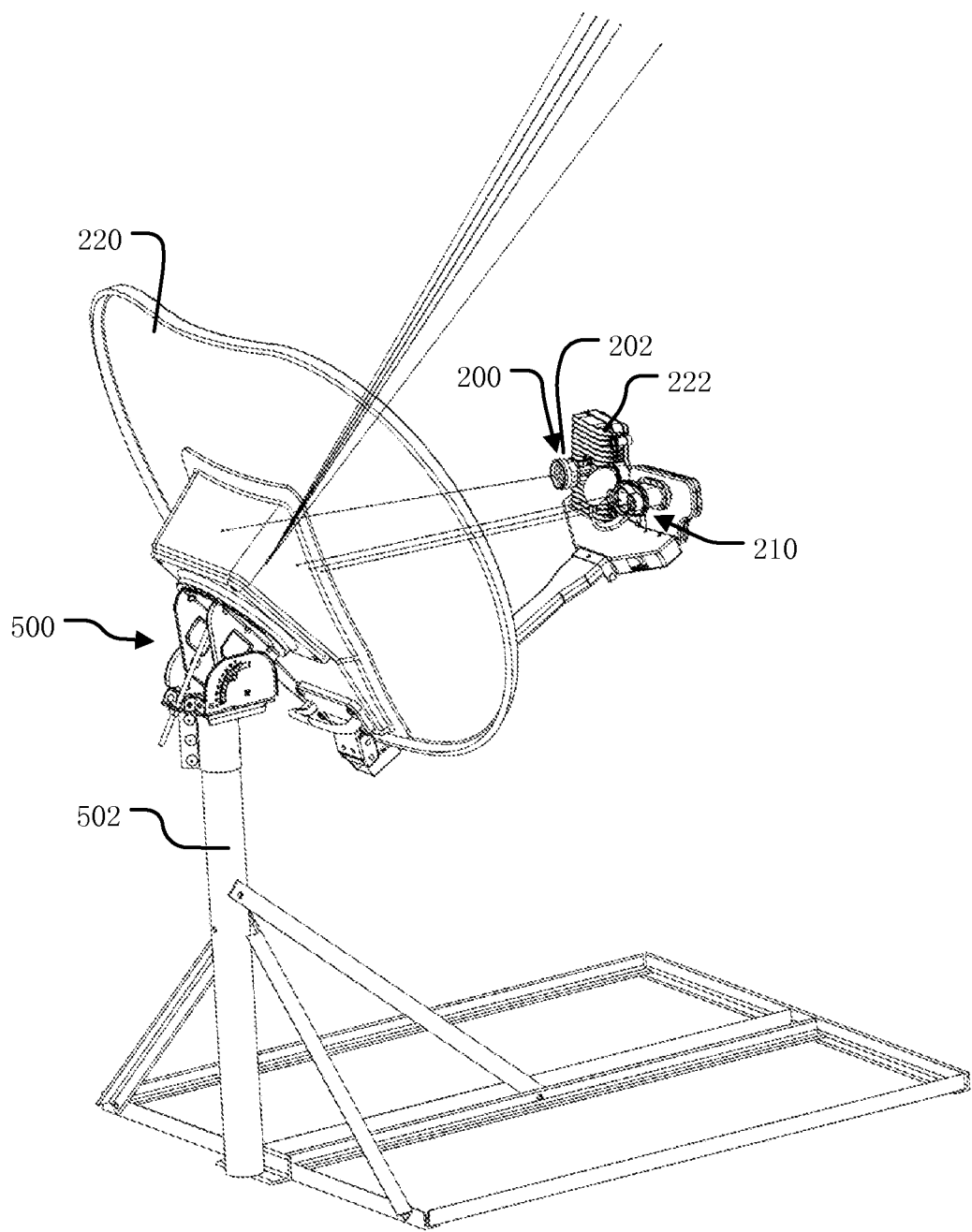

FIGS. 5A and 5B illustrate different perspective views of an example multi-beam antenna 104 including a mounting bracket assembly 500 and a mast 502.

As can be seen in FIG. 5B, the back of the reflector 220 is attached to the mounting bracket assembly 500, which in turn is attached to the mast 502. The mast 502 may for example be buried in the earth. As another example, the mast 502 may be attached to a structure such as the roof or side wall of a house.

The mounting bracket assembly 500 may be of a conventional design and can include azimuth, elevation and skew adjustments of the reflector 220 relative to the mast 502. Elevation refers to the angle between the centerline of the reflector 220 and the horizon. Azimuth refers to the angle between the centerline and the direction of true north in a horizontal plane. Skew refers to the angle of rotation about the centerline.

The mounting bracket assembly 500 may for example include bolts that can be loosened to permit the multi-beam antenna 104 to be separately moved in azimuth, elevation and skew. After positioning the multi-beam antenna 104 to the desired position in one of azimuth, elevation and skew, the bolts for that portion of the mounting bracket assembly 500 can be tightened and other bolts loosened to permit a second adjustment to be made.

The mast 502 may be installed such that it is plumb (i.e., relatively perpendicular to the horizon). The installer may then position the reflector 220 to the proper azimuth, elevation and skew. As described in more detail below, the installer positions the multi-beam antenna 104 to point the first beam group of the first feed group 200 at the first satellite group 110. The installer may position the multi-beam antenna 104 by moving the entire multi-beam antenna 104 by hand. Alternatively, the multi-beam antenna 104 may be positioned using motors or other automated mechanisms. The second feed of the second feed group 210, which is adjustable in relation to the reflector 220, is then positioned to point the second beam group of the second feed group 210 at the second satellite group 120.

The multi-beam antenna 104 may for example be initially pointed by the installer such that the first beam of the first feed 202 is pointed in the general direction of the first satellite 112. The initial azimuth, elevation and skew angles for pointing the multi-beam antenna 104 can be determined by the installer based on the known location of the first satellite 112 and the known geographic location where the multi-beam antenna 104 is being installed. In the illustrated embodiment, the reflector surface is non-parabolic and includes a major axis (the longest line through the center of the reflector 220) and a minor axis (the shortest line through the center of the reflector 220). The installer can adjust the skew angle of the multi-beam antenna 104 until the major axis of the reflector 220 is aligned with the geostationary arc. In doing so, each of the feeds of the first feed group 200 and the second feed group 210 can be pointed to a corresponding satellite along the geostationary arc.

Once the multi-beam antenna 104 is coarsely positioned to the general directional coordinates of the first satellite 112, the elevation and/or azimuth angles can be further adjusted by the installer to fine tune the pointing until the first beam group is sufficiently pointed at the first satellite group 110. The techniques for determining when the first beam of the first feed 202 is sufficiently pointed at the first satellite 112 can vary from embodiment to embodiment.

In one embodiment, the multi-beam antenna 104 may be fine pointed using the signal strength of a signal received from the first satellite 112 via the first feed 202, such as the forward downlink signal 114. Other criteria may also or alternatively be used to fine point the multi-beam antenna.

A measurement device, such as a power meter, may be used to directly measure the signal strength of the received signal. Alternatively, a measurement device may be used to measure some other metric indicating the signal strength of the received signal. The measurement device may for example be an external device that the installer temporarily attaches to the first feed 202. As another example, the measurement device may be integrated into the transceiver 222. In such a case, the measurement device may for example produce audible tones indicating signal strength to assist the installer in pointing the multi-beam antenna 104.

The installer can then iteratively adjust the elevation and/or azimuth angle of the multi-beam antenna 104 until the received signal strength, as measured by the measurement device, reaches a predetermined value. In some embodiments, the installer adjusts the position of the multi-beam antenna 104 until the received signal strength is maximized. In other words, the multi-beam antenna 104 is positioned such that the peak of the first beam is pointed directly at the first satellite 112.

Once the first beam is sufficiently pointed at the first satellite 112, the installer can immobilize the mounting bracket assembly 500 to preclude further movement of reflector 220 and first feed group 200. The installer can then use the adjustable attachment mechanism to adjustably position the second feed group 210 so that the second beam group of the second feed group 210 is pointed at the second satellite group 120.

The installer may for example use the adjustable attachment mechanism to determine when the second beam group is sufficiently pointed at the second satellite group 120 using techniques similar to those described above with respect to the pointing of the first beam group at the first satellite group 110. For example, the installer may use a measurement device to measure signal strength of one or more signals received from one or more of the satellites of the second satellite group 120 to determine when the second feed group 210 is sufficiently pointed at the second satellite group 120. These one or more received signals may for example be one or more of the DBS programming signals 132, 134, 136 transmitted by the second satellite group 120.

In embodiments in which the second feed group 210 includes multiple feeds, the signal strength of each individual signal received by each feed of the second feed group 210 may be measured when determining the final mounting position of the second feed group 210. Alternatively, the signal strength as received by less than all the feeds in the second feed group 210 may be measured. In one embodiment, the signal strength of a signal as received by a single representative feed in the second feed group 210 is measured to determine when the second beam group is sufficiently pointed at the second satellite group 120.

In some embodiments, the adjustable attachment mechanism allows the position of the second feed group 210 to be placed in one of multiple predetermined positions to provide for proper placement within the second focal region 211. In such a case, the installer may for example place the second feed group 210 in each of the predetermined positions and measure the corresponding signal strength of one or more signals received from the second satellite group 120. The installer can then select the final mounting position of the second feed group 210 from among the predetermined positions based on the measured signal strength. For example, the selected mounting position may be the predetermined position at which the measured signal strength of one or more received signal is greatest. Alternatively, other techniques may be used to select the final mounting position of the second feed group 210.

The installer can then mount the second feed group 210 at the selected final mounting position and immobilize the adjustable attachment mechanism to prevent further movement of the second feed group 210 relative to the reflector 220.

In some embodiments, at least some of the signals communicated with the first satellite group 110 are higher in frequency than the signals communicated with the second satellite group 120. In other words, a highest frequency of a first signal communicated with a satellite of the first satellite group 110 is greater than a highest frequency of a second signal communicated with a satellite of the second satellite group 120. In such a case, the pairing of the fixed and adjustable feed groups as described herein can facilitate efficient and accurate installation of the multi-beam antenna 104. Specifically, by first pointing the first beam group to the first satellite group 110, the pointing of the multi-beam antenna 104 can be done with respect to the higher frequency signals where losses and alignment errors would be most affected by misalignment of the multi-beam antenna 104.

Figure 6:
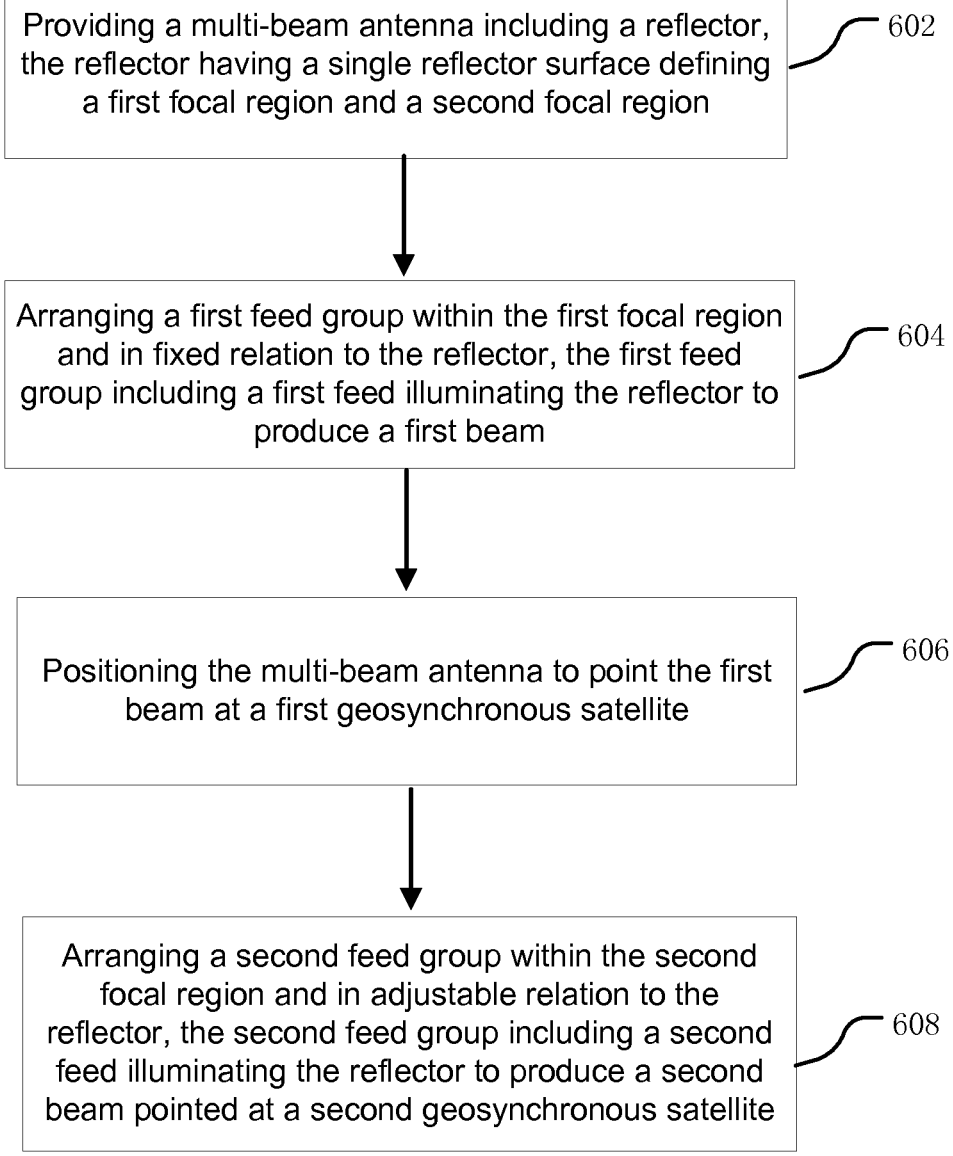
FIG. 6 illustrates an example method for pointing a multi-beam antenna to communicate with multiple satellites.

FIG. 6 illustrates an example method 600 for pointing a multi-beam antenna to communicate with multiple satellites. Other embodiments may combine some of the steps, may perform the steps in different orders and/or perform different or additional steps to the ones illustrated in FIG. 6.

At step 602, a multi-beam antenna including a reflector is provided. The reflector has a single reflector surface defining a first focal region and a second focal region. The provided multi-beam antenna may be for example the multi-beam antenna 104 described above. This step may include assembly at least some of the components of the multi-beam antenna, attachment of the reflector to a mounting bracket assembly that provides for positioning of the multi-beam antenna in azimuth, elevation and skew, and mounting to a structure such as a house.

At step 604, a first feed group is arranged within the first focal region and in fixed relation to the reflector. The first feed group includes a first feed illuminating the reflector to produce a first beam. The first feed group may be arranged in fixed relation to the reflector using a fixed adjustment mechanism as described above.

At step 606, the multi-beam antenna is positioned to point the first beam at a first geostationary satellite. The multi-beam antenna may be positioned using the techniques described above.

At step 608, a second feed group is arranged within the second focal region and in adjustable relation to the reflector. The second feed group includes a second feed illuminating the reflector to produce a second beam pointed at a second geostationary satellite. The second feed group may be arranged in adjustable relation to the reflector using an adjustable attachment mechanism as described above.

A multi-beam antenna as described herein includes a means for simultaneously reflecting electromagnetic energy between a first direction and a first focal region, and between a second direction and a second focal region. For example, in some embodiments the means for simultaneously reflecting the electromagnetic energy can be a reflector having a single reflector surface as described above. The multi-beam antenna further includes a first feed group located within the first focal region. The first feed group includes a first feed oriented to define a first beam having the first direction. The multi-beam antenna further includes a means for arranging the first feed group relative to the reflector such that the first feed group is in a fixed position relative to the reflector. For example, in some embodiments the means for arranging the first feed group can be a fixed attachment mechanism as described above. The multi-beam antenna further includes a second feed group within the second focal region. The second feed group includes a second feed oriented to define a second beam having the second direction. The multi-beam antenna further includes a means for arranging the second feed group relative to the reflector such that the second direction is adjustable relative to the first direction. For example, in some embodiments the means for arranging the second feed group can include an adjustable attachment mechanism as described above.

While the present disclosure is described by reference to the examples detailed above, it is to be understood that these examples are intended in an illustrative rather than in a limiting sense. It is contemplated that modifications and combinations will readily occur to those skilled in the art, which modifications and combinations will be within the spirit of the disclosure and the scope of the following claims.

What is claimed is:

1. A multi-beam antenna comprising:
    a reflector having a single blended reflector surface defining a first focal region and a second focal region;
    a first feed group located within the first focal region, the first feed group comprising a first feed oriented relative to the reflector to define a first beam pointed in a first direction;
    a fixed attachment mechanism attaching the first feed group to the reflector such that a position of the first feed group is fixed relative to the reflector;
    a second feed group located within the second focal region, the second feed group comprising a second feed oriented relative to the reflector to define a second beam pointed in a second direction; and
    an adjustable attachment mechanism attaching the second feed group to the reflector in an adjustable relation to the reflector, whereby a difference between the first direction and the second direction is adjustable.

2. The multi-beam antenna of claim 1, wherein the first feed and the second feed are each offset from a centerline of the reflector.

3. The multi-beam antenna of claim 1, wherein the first feed and the second feed point to different locations on the reflector.

4. The multi-beam antenna of claim 3, wherein:
    the first feed and the second feed are on opposing sides of a plane that includes a centerline of the reflector; and
    the first feed and the second feed point towards the reflector in directions away the centerline.

5. The multi-beam antenna of claim 1, wherein the second feed group further comprises a third feed fixedly attached to the second feed, the third feed oriented relative to the reflector to define a third beam pointed in a third direction.

6. The multi-beam antenna of claim 5, wherein the second feed group includes a single casting element containing the second feed and the third feed.

7. The multi-beam antenna of claim 1, wherein the first feed is operable over a first frequency band, and the second feed is operable over a second frequency band different than the first frequency band.

8. The multi-beam antenna of claim 1, wherein the first beam provides communication with a first geostationary satellite via the first feed, and the second beam provides communication with a second geostationary satellite via the second feed.

9. The multi-beam antenna of claim 8, wherein the first geostationary satellite and the second geostationary satellite are non-collocated.

10. The multi-beam antenna of claim 1, wherein an angular separation between the first direction and the second direction is at least 15 degrees.

11. The multi-beam antenna of claim 1, further comprising a transceiver coupled to the first feed group.

12. The multi-beam antenna of claim 1, further comprising a receiver coupled to the second feed group.

13. The multi-beam antenna of claim 1, wherein the fixed attachment mechanism comprises a support boom fixedly attaching the first feed group to the reflector.

14. The multi-beam antenna of claim 13, wherein the first feed group is fixedly attached to the support boom via one or more male-female fitting elements.

15. The multi-beam antenna of claim 13, wherein the second feed group is adjustably attached to the support boom via the adjustable attachment mechanism.

16. The multi-beam antenna of claim 1, wherein the adjustable attachment mechanism provides at least one degree of freedom for adjusting the position of the second feed group relative to the reflector.

17. The multi-beam antenna of claim 16, wherein the adjustable attachment mechanism provides a single degree of freedom for adjusting the position of the second feed group relative to the reflector.

18. The multi-beam antenna of claim 17, wherein the single degree of freedom is movement of the second feed group along a line.

19. The multi-beam antenna of claim 16, wherein the adjustable attachment mechanism provides two degrees of freedom for adjusting the position of the second feed group relative to the reflector.

20. The multi-beam antenna of claim 1, wherein the first feed and the second feed point directly at the reflector.

* * * * *